United States Patent [19]

Erkens et al.

[11] Patent Number: 5,804,940
[45] Date of Patent: Sep. 8, 1998

[54] DEVICE DESIGNED TO COMPENSATE FOR NON-LINEARITY OF MACHINE SHAFTS

[75] Inventors: Friedrich Erkens, Fürth; Stefan Maetschke, Altdorf; Bernd Quaschner, Moehrendorf, all of Germany

[73] Assignee: Siemens Aktiengesellschaft, München, Germany

[21] Appl. No.: 718,528

[22] PCT Filed: Feb. 3, 1995

[86] PCT No.: PCT/DE95/00146

§ 371 Date: Dec. 12, 1996

§ 102(e) Date: Dec. 12, 1996

[87] PCT Pub. No.: WO95/27930

PCT Pub. Date: Oct. 19, 1995

[30] Foreign Application Priority Data

Apr. 8, 1994 [DE] Germany .......................... 44 11 989.5

[51] Int. Cl.$^6$ .................................. G05B 11/01
[52] U.S. Cl. .......................... 318/560; 318/364; 318/569; 318/568.22; 318/568.18
[58] Field of Search .................... 318/364, 569, 318/568.18, 568.22, 572, 632; 364/474.12, 474.16, 474.19, 474.3, 474.35

[56] References Cited

U.S. PATENT DOCUMENTS 5,274,314  12/1993  Maueira .................................. 318/632

FOREIGN PATENT DOCUMENTS

90/07738  7/1990  WIPO .

OTHER PUBLICATIONS

Seidl et al, "Neural Network Compensation of Gear Backlash Hysteresis in Position–Controlled Mechanisms", IAS '93, Oct. 2–8, 1993, vol. 3 1993, pp. 2027–2034.

Primary Examiner—William M. Shoop, Jr.
Assistant Examiner—Kim Lockett

[57] ABSTRACT

A method for the numerical control of machines with several axes, in particular machine tools and robots, to compensate for the inaccuracies occurring when the axes are reversed, wherein varying friction conditions, as well as slackness and torsional effects are compensated using a friction precontrol. Rotation speed reference values are corrected by injecting a correction pulse with an acceleration-dependent injection amplitude and a constant decay time for each axis at the time of passage from one quadrant to another, with the associated change in direction. The injection amplitude and constant decay time are determined for each machine manually or learned in an additional embodiment automatically in a self-learning system in the form of a neural network.

11 Claims, 6 Drawing Sheets

DEVICE DESIGNED TO COMPENSATE FOR NON-LINEARITY OF MACHINE SHAFTS

FIELD OF THE INVENTION

The present invention relates to a method for the numerical control of machines with several axes, in particular machine tools and robots, with compensation for the inaccuracies occurring when the axes are reversed.

BACKGROUND OF THE INVENTION

In modern industrial controls used, for example, in machine tools or robots, path inaccuracies often occur when the axes are reversed, basically caused by varying friction conditions, as well as slackness and torsional effects. When an axis is accelerated from a negative to a positive velocity or vice-versa, the motion can be disturbed during passage through zero due to the varying friction conditions and mechanical non-linearities. In the case of several axes interpolating with one another, this condition results in contour errors. This fact is especially obvious in the case of circular contours, where an axis moves with maximum translational speed when going from one quadrant to another, while the second axis changes the sign of its velocity. At such points of discontinuity with change of direction, but also at start from standstill, friction, slackness and torsion effects often cause the actual rotation speeds to deviate from the reference rotation speeds. In the case of "slackness effects," arising, for example, during the operation in the form of play between the gears of an associated gearbox, points of discontinuity result in a hysteresis-type machine operation. As a result, contour errors are often produced on the work piece being machined. Since it is desirable that such contour inaccuracies be avoided, a numerical machine control process is preferably designed so that such path inaccuracies occurring due to changing friction conditions, slackness effects, and torsional effects when the machine axes are reversed can be compensated for with the help of frictional precontrol through appropriate correction of the rotation speed reference value.

It is known that conventional processes for the numerical control of machines simply add or deduct a constant amount, the slackness, to compensate for slackness, usually in carriage drives, on the path to be traveled when an axis changes signs. This is normally done once in the computation process for each individual control data set (see Weck, M.: Werkzeugmaschinen [Machine Tools], Vol. 3, Automatisierung und Steuerungstechnik [Automation and Control Technology], 3rd ed., VDI-Verlag 1989,pp. 183 ff). Therefore, in this procedure, no error compensation is built into the control process. Since the path inaccuracies arising when the machine axes are reversed usually also depend on the acceleration, the addition or subtraction of a one-time constant amount provides no sufficient compensation for inaccuracies if the acceleration conditions vary. Instead, a process that is integrated in the main run of numerical control and compensates for path inaccuracies in real time is sought.

WO 90/07738 discloses a process for correcting non-linearities wherein correction signals are provided; however, varying acceleration conditions of the machine are not provided for generating such correction signals. In addition, such correction signals are predefined according to a fixed pattern and they cannot be optimized for the particular machine being used. Furthermore, extensive circuitry is required for obtaining a suitable injection point for such a correction signal.

From the publication IAS '93 Conference record of the 1993 IEEE Industry Applications Conference 28th IAS Annual Meeting (Cat. No. 93CH3366-2), Proceedings of IEEE Industry Application Society Annual Meeting, Toronto, Ontario, Canada, Oct. 2–8, 1993, Vol. 3, 1993, pp. 2027–2034, Seidl D. R. et al. there is known a self-learning knowledge-based system for slackness compensation, which, however, cannot be used for compensating other non-linearities such as, for example, varying friction conditions or torsional effects. In addition, the slackness effects are simulated in the form of characteristic curves, which is very computation-intensive, since the complete variation of the characteristic curves must be determined. This cannot be accomplished in real time with the required accuracy and with the required response time for compensating for any non-linearity.

In the aforementioned standard processes, only path inaccuracies due to slackness effects are taken into account. Torsional effects or varying friction effects, which require corrections that vary over time, are not taken into account. Furthermore, non-linearities are always simulated in the form of characteristic curves, which is very computation-intensive and, in addition, does not take the different acceleration states of the particular machine being used in consideration.

SUMMARY OF THE INVENTION

An object of the present invention is to provide a process for numerical control of machines with several axes, in particular machine tools and robots, with compensation for inaccuracies arising when the axes are reversed, so that in addition to path inaccuracies due to slackness effects, path inaccuracies caused by varying friction conditions, as well as torsional effects, are taken into account.

In addition, compensation is done in real time and is an integral part of the numerical control. Acceleration-dependent factors are also taken into account at the same time.

According to the present invention, the aforementioned object is achieved through the following features:

1.1 Non-linearities due to disturbances are compensated for by a frictional precontrol that corrects the rotation speed reference value.

1.2 The rotation speed reference values are corrected by injecting a correction pulse to the corresponding rotation speed reference value of each axis when this axis passes from one quadrant to another with the corresponding change of signs.

1.3 The time of injection of the correction pulse takes place during the passage through zero of the rotation speed reference value.

1.4 When the rotation speed reference value passes through zero from the negative domain to the positive domain, the injection amplitude is added; when the rotation speed reference value passes through zero from the positive domain to the negative domain, the injection amplitude is subtracted.

1.5 The correction pulse has an acceleration-dependent amplitude.

1.6 The duration of the correction pulse and the variation of the acceleration-dependent amplitude are manually determined in advance as characteristic curves and/or characteristic curve fields for different acceleration values for the particular machine used, with the amplitude values selected so that they increase starting from a zero acceleration, run at a high level in the domain of medium accelerations and assume a smaller value with a further increasing acceleration.

1.7 The frictional precontrol is incorporated in an axis control as an additional precontrol branch.

A first advantageous embodiment of the present invention is particularly well-adapted to the physical properties of the varying friction, slackness, and torsional effects causing path inaccuracies, as their variation is compensated for by using an appropriate correction pulse adapted thereto. This embodiment characterized by the following feature:

2.1 A DT1 pulse is used as a correction pulse, whose decay time is constant or decreases linearly with increasing acceleration.

An alternative embodiment of the present invention avoids manual measurement of points of discontinuity of the characteristic curves and/or fields of characteristic curves of the acceleration-dependent amplitude during the startup of a particular machine tool used, and allows these values to be determined automatically by the control itself. This is achieved with the following features:

3.1 Non-linearities caused by disturbances are compensated for using a frictional precontrol correcting the rotation speed reference values.

3.2 The rotation speed reference values are corrected by injecting a correction pulse to the respective rotation speed reference value of each axis when this axis passes from one quadrant to another with the corresponding change of signs on this axis.

3.3 The correction pulse has an acceleration-dependent amplitude.

3.4 Both the duration of the correction pulse and the variation of the acceleration-dependent amplitude are determined for different acceleration values as characteristic curves and/or characteristic curve fields for the particular machine being used by a self-learning knowledge-based system in a learning phase.

3.5 The deviation from the ideal actual rotation speed from the actual rotation speed in the form of an error area appearing in the rotation speed curve after passage through zero is used as a learning criterion for the learning phase.

3.6 The frictional precontrol is incorporated in an axis control as an additional precontrol branch.

A first advantageous embodiment of the alternative development is particularly well-adapted to the physical properties of the varying friction, slackness, and torsional effects causing path inaccuracies, as their variation is compensated for by using an appropriate correction pulse adapted thereto. This is characterized by the following feature:

4.1 A DT1 pulse is used as a correction pulse, whose decay time is constant or decreases linearly with increasing acceleration.

Another advantageous embodiment of the process according to the present invention with the use of a self-learning knowledge-based system uses a particularly effective neural process for this purpose, allowing path deviations to be compensated for with great accuracy and also being very easily trained. This is characterized by the following feature:

5.1 A neural multilayer Perceptron network with error back-correction as a learning rule is used as a self-learning, knowledge-based system.

Another advantageous embodiment of the present invention uses a particularly simple form of a neural network, which can be implemented easily and cost-effectively and provides sufficient compensation accuracy for the particular application. This embodiment is characterized by the following feature:

6.1 A neural Cerebellar model articulation computer network is used as a self-learning knowledge-based system.

Another advantageous embodiment of the present invention uses as a learning criterion for training the neural network input and output parameters whose values must be mostly determined in a non error-compensating numerical control, which provide the information required for abstracting and generalizing the problem at hand in a simple form and which occur proportionally to the point of time when the correction pulses are injected, so that the numerical control according to the present invention can be implemented very inexpensively. This is characterized by the following features:

7.1 The deviation from the ideal desired rotation speed reference value and the actual rotation speed in the form of an error area generated by the rotation speed variation after passage through zero is used as the learning criterion for assigning input values to the desired output values.

7.2 In order to determine the error area, the desired ideal actual rotation speed and actual rotation speed are differentiated first starting from the point of injection, whereby the constant distance between the rotation speed reference value and the actual rotation speed is eliminated, then integrated again and finally integrated again over the error area.

Another advantageous embodiment of the present invention broadens its functionality by the fact that the system automatically adapts to the varying conditions during operation and thus makes a new training process of a neural network by the operator superfluous. This embodiment is characterized by the following feature:

8.1 The learning rule for determining the variation of the characteristic curves and/or characteristic curve fields of the acceleration-dependent amplitude is further used in the work phase, so that the frictional precontrol is constantly adapted to the changed operating conditions and possible wear phenomena are automatically compensated for.

Another advantageous embodiment of the present invention optimizes the condition of the time of injection of the correction pulse and allows the actual values to be corrected by means of a particularly simple design. This embodiment is characterized by the following features:

9.1 The correction pulse is injected at the time when the rotation speed reference value passes through zero.

9.2 When the rotation speed reference value passes through zero from the negative domain to the positive domain, the injection amplitude is added; when the rotation speed reference value passes through zero from the positive domain to the negative domain, the injection amplitude is subtracted.

An advantageous device for performing the process according to the present invention is characterized in that it can be implemented with few additional components and thus at a limited cost and it can be integrated in an existing axis control. This device includes the following features:

10.1 A frictional precontrol is integrated in an axis control as an additional precontrol branch.

10.2 There is provided a first differentiator to differentiate the position reference value and an additional differentiator to differentiate the rotation speed reference value for acceleration reference values obtained.

10.3 The rotation speed reference values obtained are injected into an injection logic controlling the injection time when the rotation speed reference value passes through zero.

10.4 There is a storage device provided to receive the acceleration-dependent characteristic amplitude curve obtained, which storage device is triggered by the acceleration reference values; the characteristic curve of the amplitude increases starting from zero acceleration, runs at a high level in the area of medium accelerations and assumes smaller values again when the acceleration further increases.

10.5 The injection amplitudes obtained using the characteristic curve of the amplitude are supplied to a correction pulse generator, which generates rotation speed correction values and adds them to a position control signal of the axis control.

An alternative device allows a neural network to be used as a self-learning knowledge-based system in the above-described device. It can be implemented at a low additional cost and also integrates all the advantageous features of the previously described embodiments of the present invention regarding both the process and the device in its form presented previously. This device includes the following features:

11.1 A frictional precontrol is integrated in an axis control as an additional precontrol branch.

11.2 There is provided a first differentiator to differentiate the position reference value and an additional differentiator to differentiate the rotation speed reference value obtained for generating the acceleration reference values.

11.3 The rotation speed reference values are injected into an injection logic controlling the injection time.

11.4 There is provided a neural network to whose input the rotation speed reference values and acceleration reference values are supplied.

11.5 An error value, formed in a logic circuit from the difference of the rotation speed reference value and the actual rotation speed, is supplied to the output of the neural network.

11.6 The injection logic is supplied with an amplitude value and a time constant by the neural network.

11.7 There is provided a correction pulse generator, triggered by the injection logic according to the amplitude, the time constant, using the rotation speed reference value, and which generates rotation speed correction values and adds them to a position control signal of the axis control.

The advantages achieved with the present invention include, in particular, the fact that with the above-described process, path inaccuracies caused by different factors, occurring when an axis is reversed, can be compensated for with a single correction process. Thus, inaccuracies of the machine axes caused by both varying friction conditions and mechanical non-linearities, as well as factors such as slackness effects and torsional effects, can be compensated for. Furthermore, errors are compensated in real time and the process according to the present invention becomes an integral part of a conventional numerical control. Where a self-learning knowledge-based system such as a neural network with error back-propagation learning process is used, there is achieved the advantage of eliminating the expensive manual determination of a characteristic curve or a field of characteristic curves by the operator and automating this procedure. Furthermore, the above-described advantages can be implemented in the present invention particularly effectively at a low cost and with high precision by using fewer additional components.

DETAILED DESCRIPTION

Figure 1:
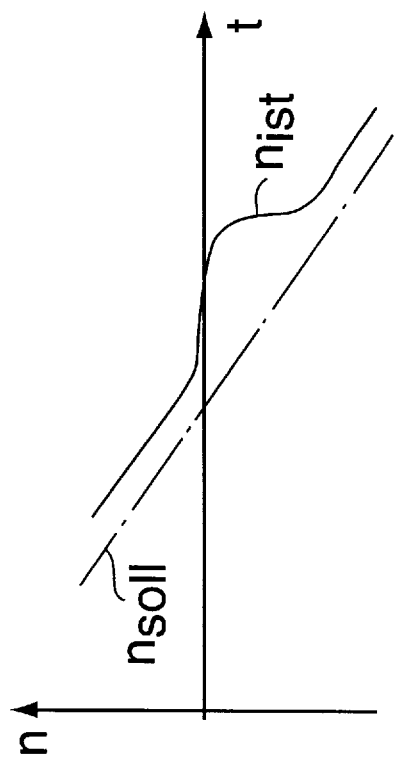
FIG. 1 shows the variation of a rotation speed with change of sign in relation to the friction moment, taking into account a friction coefficient, as well as the cogging of the actual rotation speed due to friction.
Figure 1:
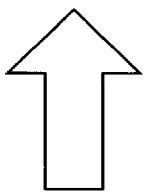
Figure 1:
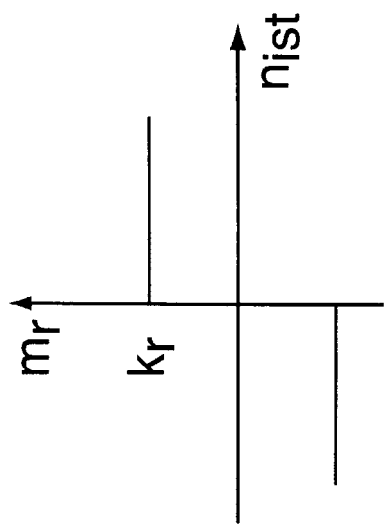

In the illustration of FIG. 1, the variation of the friction conditions is modeled in a simplified manner using a Signum function, where n is the actual rotation speed, $k_r$, is a friction coefficient, and $m_r$ is the friction moment. Two coordinate systems are shown. In the coordinate system shown on the left, the rotation speed is plotted against the friction moment, with the rotation speed and the friction moment $m_r$ related to it, changing signs. In the rotation speed diagram, shown on the right, in which the rotation speed n is plotted against time t, this results in the actual rotation speed $n_{ist}$ "cogging" for a short period of time in the time axis t. As a result, the actual rotation speed variation $n_{ist}$, represented by a solid line, differs from the desired rotation speed reference value $n_{soll}$, which is represented by a broken straight line.

Figure 2:
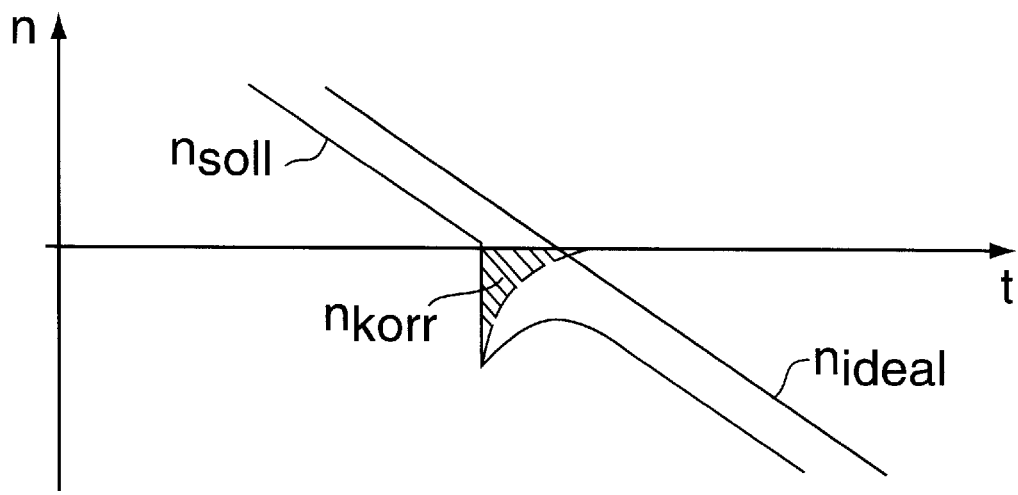
FIG. 2 shows the correction of an erroneous variation of the actual rotation speed due to friction with the help of a correction pulse.

Furthermore, FIG. 2 shows another rotation speed diagram, where the rotation speed n is plotted against time t. The diagram shows how a given rotation speed reference value variation $n_{soll}$ must be corrected with a correction value $n_{korr}$ so that the rotation speed variation $n_{ideal}$ that should be actually obtained corresponds to the variation of the rotation speed reference value $n_{soll}$ as shown in FIG. 1. The correction pulse $h_{korr}$ is shown in the form of a dotted line and delimits the shaded area between this broken line and the time axis.

Figure 3:
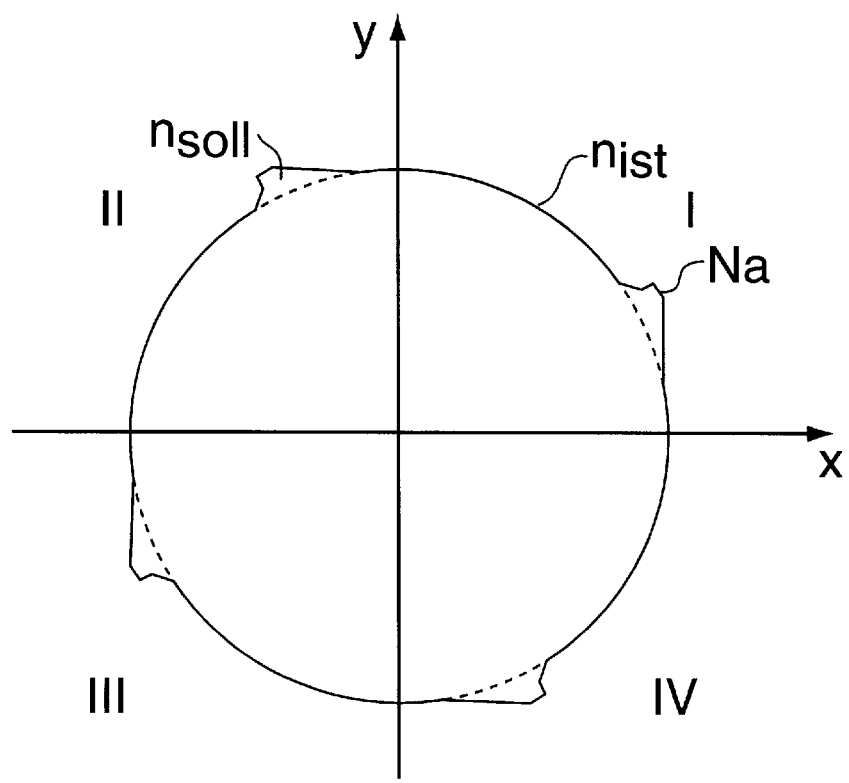
FIG. 3 shows a circular contour with quadrant transition of two interpolating axes with an actual variation of the rotation speed deviating from the desired rotation speed reference value due to friction effects.

FIG. 3 shows a circular path traveled by two interpolating axes x and y. The abscissas represent the axis in the X direction, and the ordinates in the Y direction. They form the four quadrants I, II, III, and IV. The variation of the actual rotation speed $n_{ist}$ deviates from the predefined rotation speed reference value $n_{soll}$ of the circular contour. The variation of the actual rotation speed has "noses" Na after each passage from one quadrant to another due to the "cogging" caused by friction, departing from the ideal circumference in the direction opposite to its center. The desired circular contour, the rotation speed reference value $ns_{soll}$ is represented in the form of a dotted circumference in the area of the "nose" Na.

Figure 4:
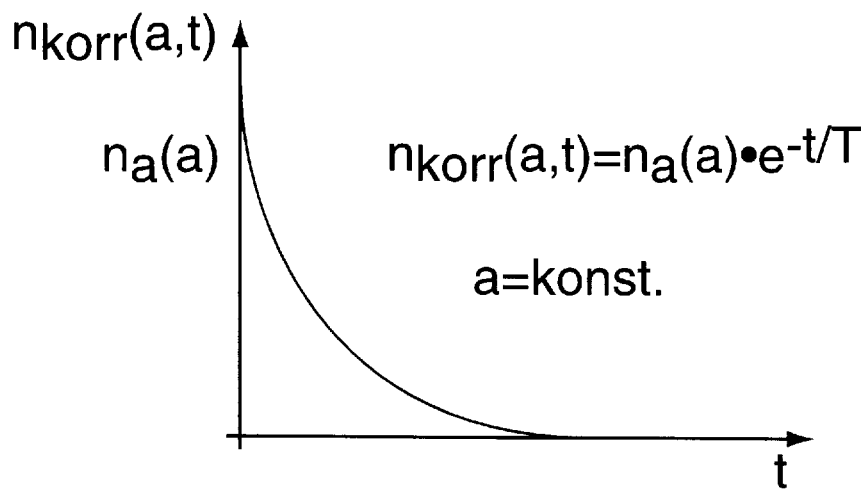
FIG. 4 shows a DT1 correction pulse.

FIG. 4 shows the variation of a DT1 correction pulse $n_{korr}(a,t)$ plotted against time t. The curve starts with an acceleration-dependent injection amplitude value $n_a(a)$ and approximates the time axis exponentially until it reaches zero. The illustration applies to an acceleration a assumed to be constant.

Figure 5:
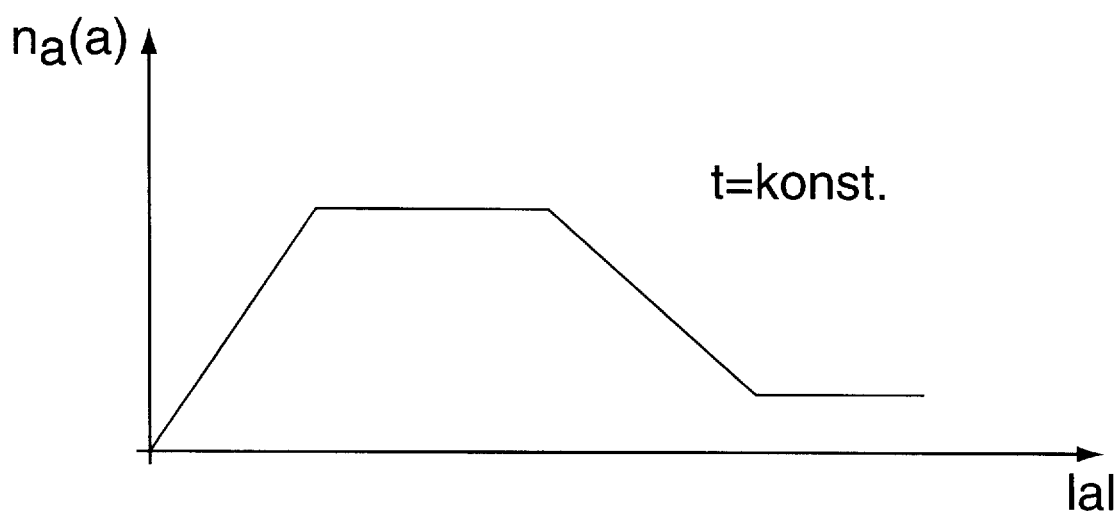
FIG. 5 shows an acceleration-dependent characteristic amplitude curve.

FIG. 5 shows a possible shape of the amplitude characteristic curve $n_a(a)$ plotted against the absolute value of the acceleration |a| for a time t assumed to be constant. The amplitude increases sharply in the area of minor acceleration, then becomes constant, subsequently decreasing to a lower value where it adjusts itself to a constant value again.

Figure 6:
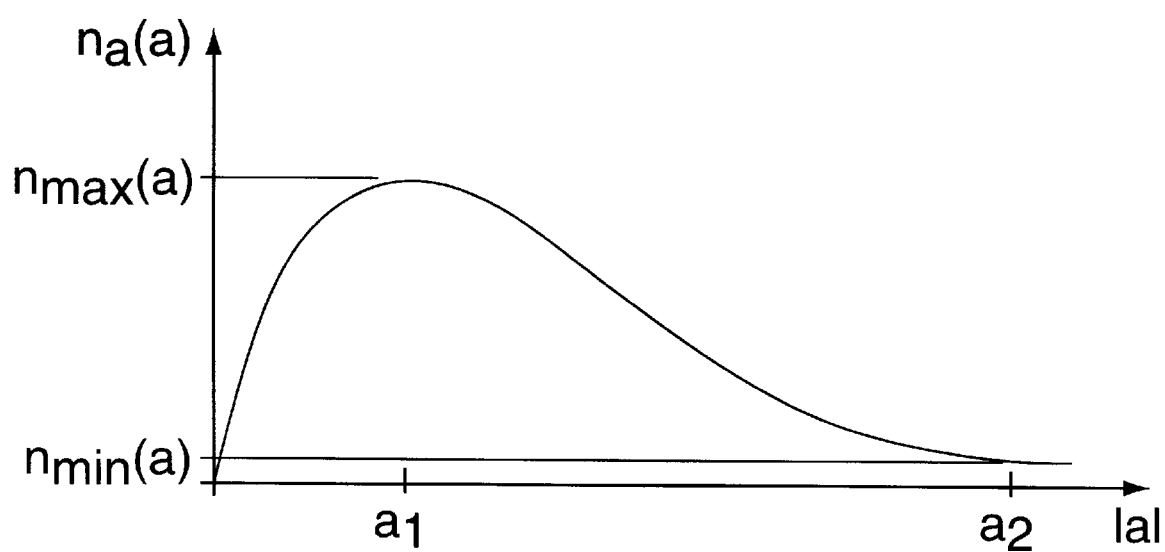
FIG. 6 shows an actual characteristic curve for quadrant error compensation.

FIG. 6 shows the actual amplitude characteristic curve of FIG. 5 for the quadrant error compensation such as, for example, that shown for a circular contour according to FIG. 3. Again, the acceleration-dependent initial injection amplitude $n_a(a)$ of a correction pulse to be determined, is plotted between its minimum and maximum values. Starting from zero acceleration, the amplitude initially increases sharply, then with decreasing rotation acceleration until a maximum amplitude $n_{max}(a)$ is reached at acceleration a1, it gradually decreases from there and finally adjusts itself at a minimum amplitude $n_{min}(a)$ independently of the later, even higher, acceleration at a2.

Figure 7:
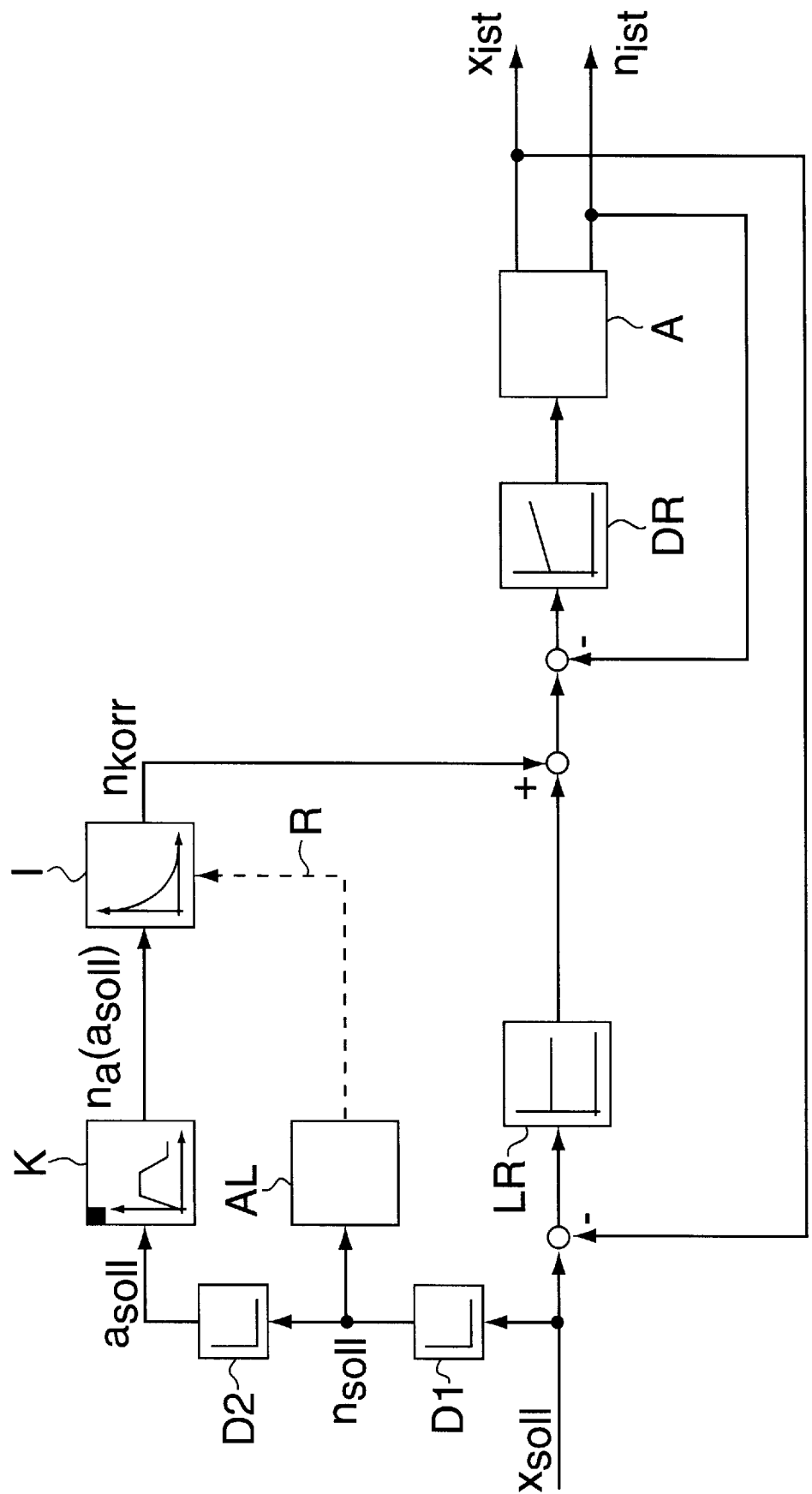
FIG. 7 shows the integration of the frictional precontrol into an axis control.

FIG. 7 shows the integration of the frictional precontrol into an existing axis control. A position reference value $x_{soll}$ is supplied to the device, differentiated in a first differentiator D1 so that a rotation speed reference value $n_{soll}$ is obtained, which is supplied to an injection logic AL. Subsequently, the rotation speed reference value $n_{soll}$ is differentiated in a second differentiator D2, and the reference acceleration $a_{soll}$ obtained is supplied to a storage device K containing the acceleration-dependent characteristic curve of the amplitude. The initial correction $n_a(a_{soll})$ obtained therefrom, also referred to as injection amplitude, is supplied to a pulse generator I, which generates an appropriate DT1 correction pulse $n_{korr}$. The injection logic AL controls the start time through a reset signal R with which it triggers pulse generator I. Within the existing axis control, the position reference value $x_{soll}$ is supplied to a position controller LR. Its output is added to correction pulse $n_{korr}$ and supplied to a rotation speed controller DR, which is usually implemented as a PI controller, and therefrom supplied to a machine axis A. The actual position value $x_{ist}$ and the actual rotation speed $n_{ist}$ are available at the output of machine axis A. The actual position value $x_{ist}$ is supplied as a negative feedback to the position reference value available on the input side, and the actual rotation speed $n_{ist}$ is supplied as a negative feedback to the input of rotation speed controller DR.

Figure 8:
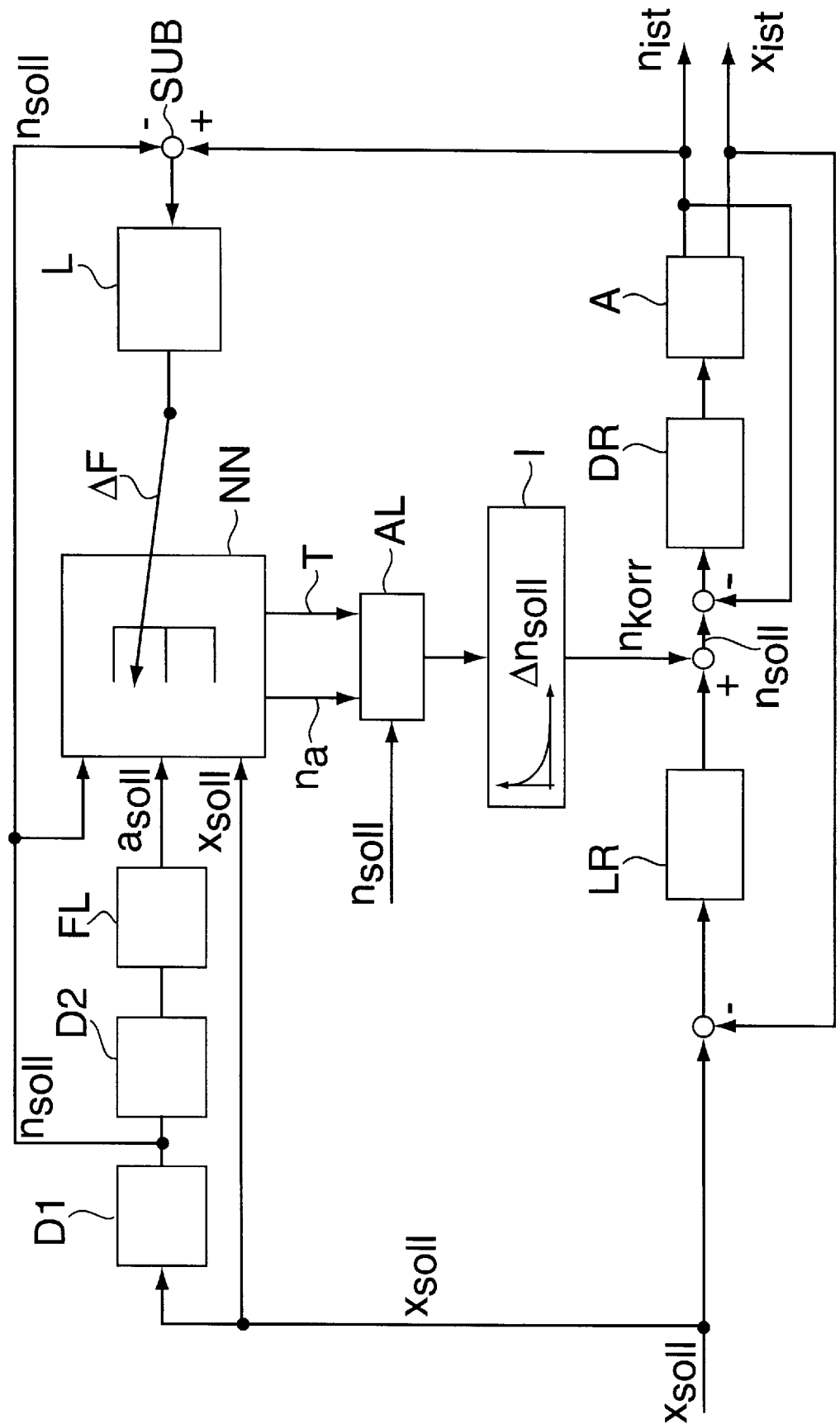
FIG. 8 shows quadrant error compensation with the use of a neural network.

FIG. 8 shows the device described in FIG. 7 for quadrant error compensation with the use of a neural network. It differs from the arrangement illustrated in FIG. 7 in that the reference acceleration formed by differentiator D2 also goes through a filter FL prior to being supplied to neural network NN at its input layer. The position reference value $x_{soll}$ is also supplied to the input of neural network NN. Rotation speed reference value $n_{soll}$ available after passage through differentiator D1 is also supplied to the input of neural network NN. Rotation speed reference value $n_{soll}$ and the actual rotation speed $n_{ist}$, available at the output of machine axis A, are supplied to a subtractor SUB, where the rotation speed reference value $n_{soll}$ is subtracted from the actual rotation speed $n_{ist}$ and the difference is supplied to logic unit L, where the difference is processed into an error term F and this error term F is supplied to the output layer of neural network NN. Amplitude a and time constant T, which trigger injection logic AL, are available at the outputs for the work phase. Furthermore, reference accelerations $n_{soll}$ are supplied to injection logic AL, as described earlier in the device of FIG. 7. Injection logic AL triggers a correction pulse generator I which generates a correction pulse $n_{korr}$ which is added to the output signal of position controller LR.

If an axis is accelerated from a negative to a positive speed or vice-versa, the motion is disturbed during passage through zero by varying friction conditions and mechanical non-linearities such as slackness effects or torsional effects. In the case of axes interpolating with one another, this condition usually results in contour errors. Therefore, most path inaccuracies that occur when a machine axis is reversed are compensated for according to the present invention with the help of a frictional precontrol performing a suitable correction of the rotation speed reference value $n_{soll}$. For this purpose, a characteristic curve is determined for the amplitude of the correction pulse $n_a(a)$, which is injected in the rotation speed reference value $n_{soll}$.

In order to determine a correction pulse suitable for compensating for path inaccuracies, it is recommended that the effect of varying friction conditions be countered on a single machine axis. For this purpose, FIG. 1 shows the variation of friction modeled in a simplified manner with a Signum function, where $n_{ist}$ represents the actual rotation speed, $k_r$ the friction coefficient, and $m_r$ the friction moment. As the actual rotation speed $n_{ist}$ changes directions, friction moment $m_r$ also changes signs and the actual rotation speed "cogs" on the time axis for a short period in the rotation speed diagram. This results in the actual motion of the axis deviating from the programmed rotation speed profile $n_{soll}$.

This deviation becomes particularly apparent, for example, in the case of circular contours, where an axis moves with maximum speed when passing from one quadrant to another, denoted in FIG. 2 by I, II, III, and IV, while the second axis changes the sign of its velocity, coming to a standstill for a short period of time. The resulting deviations from the circular contour can be determined using a circular shape test or a circular travel. The results of such a circular shape test are shown in FIG. 3. It shows with particular clarity the effect of "cogging" typically appearing during the transition from one quadrant to another without the compensating measures of the present invention. The deviations ("noses") Na in the actual rotation speed $n_{ist}$ can be clearly seen.

With the frictional precontrol according to the present invention, the "cogging" of an axis is avoided by injecting a correction pulse in the rotation speed reference value. A DT1 pulse with an acceleration-dependent amplitude $n_a(a)$ and constant decay time T is used as a correction pulse. The variation of this correction pulse over time is shown in FIG. 4 and describes an exponentially decreasing function, whose injection amplitude $n_a(a)$ is adjustable. This relationship is represented mathematically by the following equation:

$$n_{korr}(a,t)=n_a(a)e^{-t}.$$

If the amplitude a and time T of the correction pulse are suitably selected, the desired variation of the actual rotation speed value $n_{ist}$ can be achieved and the contour deviations disappear. Such a case is illustrated as an example in FIG. 2. Here the cogging of the actual rotation speed $n_{ist}$ shown in FIG. 1 is corrected by the injection of a correction pulse $n_{korr}$ in the rotation speed reference value $n_{soll}$, which results in the actual rotation speed value $n_{ist}$, corresponding to the programmed rotation speed profile and shifted by an equivalent time constant of the numerical control shown in FIG. 2. In order to achieve a sufficiently good compensation for the friction, slackness and torsional effects, the pulse amplitude must be injected as a function of the acceleration a, while the pulse duration T may be constant. The injection amplitude of the correction pulse therefore cannot remain constant over the entire acceleration range, since at higher accelerations precontrol with smaller compensation values must be used than in the case of lower accelerations. For small variations in the axis velocity, as, for example, in the jogging mode, quadrant error compensation should not be used at all. Therefore the relationship represented in FIG. 5 is obtained as the characteristic curve of the amplitude, approximating the actual conditions. Assuming a constant point in time t, the curve of the injection amplitude $n_a(a)$ assumes the following shape. Starting at zero acceleration, the correction amplitude increases sharply, then remains at a constant high value in the area of a medium acceleration. As acceleration further increases, the value of the correction amplitude decreases again and adjusts itself at a constant, but lower, value in the area of very high accelerations.

The break points of these characteristic curves depend on the particular machine tool and must be determined during startup. For this reason, the quadrant error compensation according to the present invention contains a manually adjustable characteristic curve for estimating the injection amplitude as a function of the acceleration. The characteristic curve can be characterized by parameters via the machine data. The interpolation points of the characteristic curve are determined during the startup of the quadrant error compensation of the frictional precontrol for any given machine by measurement with a circular shape test. A quadrant error compensation characteristic curve thus determined is shown as an example in FIG. 6. The actual variation of the correction amplitude $n_a(a)$ differs from the characteristic curve developed experimentally (FIG. 5) by its non-linear shape. In the area of very small accelerations between zero and a1, the correction amplitude rises steeply until it reaches a maximum amplitude $n_{max}(a)$ at acceleration a1. From there, the correction amplitude drops with increasing acceleration and finally, when a greater acceleration a2 is reached, it adjusts itself at a minimum value for the correction amplitude $n_{min}(a)$.

For the circular shape test illustrated in FIG. 3, the actual rotation speeds $n_{ist}$ remain occasionally equal to zero without this compensation for friction and other disturbing influences according to the present invention during a plurality of position control cycles, after the rotation speed reference value of an axis has passed through zero. This condition results in the contour errors mentioned earlier. By injecting an additional, sufficiently large correction pulse $n_{korr}$ with the correct sign when the rotation speed reference value $n_{soll}$ of an axis passes through zero, the cogging axis is released and the contour error is minimized. The injection time for the correction pulse is determined by a special injection logic AL. According to the present invention, the compensation pulse or correction pulse $n_{korr}$ is injected at the time the rotation speed reference value $n_{soll}$ passes through zero. This is because the passage of the rotation speed reference value $n_{soll}$ through zero can be determined accurately, while the passage of the actual rotation speed $n_{ist}$ through zero can fluctuate. Furthermore, position control usually responds with a delay, and therefore a correction pulse triggered by the actual rotation speed would act too late to achieve good compensation. The time starting at which the compensation is to support the axis motion is the point of reversal of the direction of travel, i.e., a rotation speed sign change. The actual rotation speed values $n_{ist}$, however, follow the rotation speed reference values $n_{soll}$ with a delay equal to the equivalent time constant of the speed control used. Due to this time lag, the actual rotation speed is not suitable for determining the time of injection. In addition, the circular shape test makes it clear that compensation is not required before the transition from one quadrant to another. The transition of an axis from one quadrant to another in a particular path, however, is characterized by the passage of the corresponding rotation speed reference value $n_{soll}$ through zero. The direction of the passage through zero is determined as the condition for the time of injection of a correction pulse. If the passage takes place from the positive to the negative rotation speed domain, the rotation speed reference value $n_{soll}$ is compensated by a subtraction of the correction pulse. In the other case of a passage through zero from the negative to the positive rotation speed domain, the correction pulse is added to the corresponding rotation speed reference value $n_{soll}$.

In order to implement a frictional precontrol with quadrant error compensation as an integral component of an axis control, the frictional precontrol is integrated in a conventional axis control as an additional precontrol branch. Such a device in accordance with the present invention is shown in FIG. 7. Normally, position reference values $x_{soll}$ are supplied to the input side in axis control. These position reference values are then differentiated according to the present invention in a first differentiator D1, yielding rotation speed reference values. These rotation speed reference values $n_{soll}$ trigger an injection logic AL, which is responsible for resetting (R) a pulse generator I which generates correction pulse $n_{korr}$ when the rotation speed reference value $n_{soll}$ passes through zero. The rotation speed reference value $n_{soll}$ obtained by the first differentiator D1 is supplied to a second differentiator D2, which generates the acceleration reference value asoll, which is used to trigger storage device K, where the acceleration-dependent correction amplitude is stored. Then the correction amplitude $n_a$ corresponding to the desired acceleration $a_{soll}$ becomes available at the output of storage device K. This value is supplied, as an initial value, to correction pulse generator I, preferably a DT1 element. The compensation or correction pulses $n_{korr}$ generated by correction pulse generator I are finally added to the output value of the position controller LR of a conventional axis control. A rotation speed reference value thus obtained is then normally supplied to a rotation speed controller DR, usually a PI controller, whose output values are supplied to a machine-tool axis, whose position reference value $x_{ist}$ and actual rotation speed value $n_{ist}$ are fed back to the axis controller. The rotation speed reference value $n_{soll}$ is supplied as a negative feedback to the input of rotation speed controller DR, but only after the correction pulse $n_{korr}$ has been added to the output value of position controller LR. The actual position value $x_{ist}$ is supplied to the input of position controller LR as a negative feedback, i.e., deducted from the incoming position reference value $x_{soll}$. The position reference values used for the frictional precontrol are not affected by this process.

The labor-intensive manual determination of the knee points for the amplitude characteristic curve can also be avoided and the process automated with the help of the present invention. The relatively time-consuming determination of characteristic lines or characteristic line fields of the acceleration-dependent amplitude are learned automatically with the help of a self-learning knowledge-based system and thus the startup time of the machine is reduced.

An advantageous embodiment with the use of a self-learning knowledge-based system determines the aforementioned dependence of the correction amplitude on the acceleration with a neural network in its learning phase with the purpose of achieving the accuracy of the previously manually determined solution for quadrant error compensation. An error back-propagation network is used as a particularly suitable representative of the group of neural networks. Neural networks NN can learn the relationships among a plurality of inputs and outputs; therefore not only can they learn characteristic curves, but also characteristic curve fields. In order to learn the acceleration-dependent correction amplitude $n_a(a)$, the original characteristic curve according to FIG. 6 is replaced with a characteristic curve field, which replaces the relationship between the correction amplitude $n_a$ and decay time T on the one hand as a function of the input value position in the form of the position reference values $x_{soll}$ and acceleration a on the other hand. This improves the accuracy of the compensation process that can be achieved for large axis travel paths. The time of injection for the correction pulses is predefined, as previously, by an injection logic AL, i.e., not learned from the neural network.

In the case of error back-propagation networks, learning is done according to the generalized delta rule in the form of an error back-correction process. To execute this learning rule, the neural network NN needs a learning criterion according to which it can be adjusted in the training phase (learn phase) whether the corresponding desired output values are to be assigned to one or more input values. The quality and accuracy with which the desired output values can be obtained are affected by the selection of this learning criterion. In order to determine an advantageous learning criterion, the present invention uses the relationship between the rotation speed reference value $n_{soll}$ and the actual rotation speed $n_{ist}$, which is established without quadrant error compensation measures. Assuming a sinusoidal variation of the rotation speed reference value, the actual rotation speed will follow a similar variation according to an equivalent time constant of the rotation speed controller. Because of the friction effects and other mechanical disturbances such as slackness and torsional effects, however, the actual rotation speed $n_{ist}$ differs from the ideal sinusoidal variation. Therefore, after passage through zero, an error area appears between the ideal actual rotation speed $n_{ideal}$ and the actual rotation speed $n_{ist}$. The size of this error area is used as the learning criterion. The training process of a neural network NN takes place according to the exemplary training data and this data material must be processed in several epochs until the learning process converges; therefore, a variation of the actual rotation speed value $n_{ist}$, where the error area oscillates around the ideal sinusoidal variation of the desired ideal actual rotation speed $n_{ideal}$ due to the learning process or due to disturbances in the control circuits is not suitable for determining the error area by simple summation. A simple summation would yield a zero error area if the positive and negative components were of the same size. If the positive and negative components of the error area were different, the calculation would be very inaccurate in this case as well. Therefore, in the case of a simple summation, an incorrect injection or correction amplitude would be determined for the quadrant error compensation. The situation is more complicated when the variation of $n_{ist}$ repeatedly oscillates around the ideal sinusoidal variation due to disturbances of the actual rotation speed. In such cases, simple summation of the error areas also results in problems. Therefore, for the accurate determination of the error area in the present invention, distinction is made between the ideal actual rotation speed $n_{ideal}$ and the actual rotation speed $n_{ist}$ starting from the time of injection, so that the corresponding acceleration results from the rotation speed. When differentiating, the difference between the rotation speed reference value $n_{soll}$ and the actual rotation speed $n_{ist}$, due to a time shift by the equivalent time constant of the rotation speed controller, disappears. The partial areas obtained this way are integrated again to undo the differentiation. Then integration is performed once again over the error area obtained. The resulting area is contiguous and has a positive value. As an optimization criterion for the learning rule, it is considered that the injection or correction amplitude $n_a(a)$ is learned with sufficient accuracy if the error area F thus obtained is equal to zero. If this optimization criterion is met, the neural network has stored the variation of a suitable characteristic curve of the amplitude with sufficient accuracy in its knowledge base represented by threshold values and weights. If the appropriate input values are applied to its input, the corresponding outputs for calculating the correction amplitude are delivered.

In a device using an error back-propagation network NN instead of a fixed characteristic curve of the amplitude, the neural network NN assumes the role of the storage device K. It is supplemented by a logic unit L, which processes the difference between rotation speed reference value $n_{soll}$ and the actual rotation speed $n_{ist}$ fed back from the output of axis A formed in a subtractor SUB, and determines therefrom the error area F by the aforementioned process. The error F is supplied to the output of neural network NN. The position reference values $x_{soll}$, the rotation speed reference value $n_{soll}$ derived in differentiator D1, and the acceleration reference value $a_{soll}$ derived in differentiator D2 and which is previously filtered in a filter FL, are supplied to the input layer of neural network NN as input values. After a successful learning phase, neural network NN delivers the value of the correction amplitude $n_a$ and time constant T as output values in the working phase, which are then supplied to pulse generator I through injection logic AL, triggering said pulse generator.

An advantageous alternative embodiment replaces the measured and therefore fixed characteristic curve of the frictional precontrol amplitude with a very simple neural network, a "CEREBELLAR MODEL ARTICULATION COMPUTER" or, for short, CMAC. This is a highly simplified model of signal processing, such as performed by the cerebellum. In the form used in the invention, the CMAC is basically reduced to a table of amplitude values, which are adaptively optimized through a plurality of approximation steps. This means that the characteristic curve of the amplitude is divided into a plurality of steps or table entries, and the steps can be smoothed in a simple manner with linear interpolation between the table entries. In this way, a considerably higher degree of flexibility is gained regarding the shape of the characteristic curve and the frictional precontrol can be adapted to a given machine if so desired.

In order to determine the table values, the machine tool performs a plurality of passages through zero, e.g. in circular travel in both neural networks. The CMAC optimizes the amplitude values using the differences between the actual rotation speed values $n_{ist}$ and the rotation speed reference values $n_{soll}$. Ten to fifteen iterations are usually sufficient for this approximation process.

The characteristic curves of the amplitudes of different axes are seldom identical; therefore, each axis is provided with its own neural network NN in both processes: neural error back-propagation network and CMAC. Due to the simple design, the additional computations for CMAC are limited to a few additions and multiplications timed by the position controller. This has the advantage that little additional computation is needed, adaptation can be carried out quickly, the system is flexible and can also be implemented inexpensively. The neural frictional precontrol according to the present invention makes it possible to reduce the time required for the determination of a suitable characteristic curve of the amplitude from a day to approximately one hour. The contour error at the quadrant transitions is up to ten times smaller, with either manual or neural frictional precontrol, than without correction pulses. Furthermore, deviations caused by slackness and torsion are compensated for. In this case, the complexity of the algorithm and the computations of the neural frictional precontrol required are only slightly greater than in the manual solution based on characteristic curves. In addition, greater application flexibility is achieved with neural frictional precontrol, because the shape of the characteristic curve can be adapted to the actual conditions more quickly and accurately than a human being would normally be capable of doing.

A further improvement of the above-described process consists, according to the present invention, of the fact that it can be decided, for example, when using a neural error back-propagation network NN for the logic unit L, whether or not the learning rule should continue to be used in the working phase of the machine. If the learning rule is disabled, the optimum weight settings and threshold settings once calculated are no longer modified in the knowledge base of the neural network NN. On the other hand, if the learning rule continues to be used in the working phase, the neural frictional precontrol will continuously adapt itself to the changing operating conditions. In this way, wear phenomena, temperature effects, or changes in the lubricant, as well as increased slackness effects can be automatically compensated for in the day-to-day operation. This makes additional maintenance work or constant relearning of the optimum characteristic curve of the amplitude superfluous.

In addition to the two neural processes described, error back-propagation network and CMAC, other neural networks can also be used for determining an optimum characteristic curve of the amplitude. Thus, with the present invention, also combined processes with neural networks and fuzzy logic rules can be used. Such units, referred to as neuro-fuzzy systems, offer the advantage that rule-based prior knowledge, weighted by probabilities, can be introduced directly into the topological structure of the neural network.

Such units, referred to as neuro-fuzzy systems, also offer the advantage that the topology of the neural network can be optimized through fuzzy rules.

The process according to the present invention is used separately for each machine axis concerned. Therefore, it can also be used on machines with a single axis to compensate for non-linearities.

We claim:

1. A method for the numerical control of machines with at least one axis comprising the steps of:
   compensating for non-linearities due to disturbances with a frictional precontrol that corrects a rotation speed reference value of each axis, the correction of the rotation speed reference values including the substeps of:
   injecting a correction pulse into the corresponding rotation speed reference value of each axis when the corresponding axis passes from one quadrant to another with the corresponding change of signs at this axis, the correction pulse being injected during the passage through zero of the rotation speed reference value, wherein:
   when the rotation speed reference value passes through zero from negative values to positive values, the correction pulse is added and when the rotation speed reference value passes through zero from positive values to negative values, the correction pulse is subtracted,
   the correction pulse has an acceleration-dependent amplitude, and
   the amplitude and duration of the correction pulse are determined in advance as characteristic curves or characteristic curve fields for different acceleration values for the particular machine used, with the amplitude values being selected so that they increase starting from a zero acceleration, run at a high level in the domain of medium accelerations and assume smaller values with further increasing acceleration,
   wherein the frictional precontrol is incorporated in an axis control as an additional precontrol branch.

2. The method of claim 1, wherein the correction pulse is a DT1 pulse with a decay time which is constant or decreases linearly with increasing acceleration.

3. A method for the numerical control of machines with at least one axis comprising the steps of:
   compensating for non-linearities due to disturbances with a frictional precontrol that corrects a rotation speed reference value of each axis, the correction of the rotation speed reference values including the substeps of:
   injecting a correction pulse into the corresponding rotation speed reference value of each axis when the corresponding axis passes from one quadrant to another with the corresponding change of signs at this axis, the correction pulse being injected during the passage through zero of the rotation speed reference value, wherein:
   the correction pulse has an acceleration-dependent amplitude, and
   the amplitude and duration of the correction pulse are determined in advance as characteristic curves or characteristic curve fields for different acceleration values for the particular machine used through a self-learning knowledge-based system in a learning phase, wherein a deviation from a desired actual rotation speed and an actual rotation speed in the form of an error area appearing in a rotation speed curve after passage through zero is used as a learning criterion for the learning phase;
   wherein the frictional precontrol is incorporated in an axis control as an additional precontrol branch.

4. The method of claim 3, wherein the correction pulse is a DT1 pulse with a decay time which is constant or decreases linearly with increasing acceleration.

5. The method of claim 3, wherein the self-learning, knowledge-based system includes a neural multilayer Perceptron network with error back-correction.

6. The method of claim 3, wherein the self-learning, knowledge-based system includes a neural Cerebellar Model Articulation Computer network.

7. The method of claim 3, wherein to determine the error area, the desired ideal actual rotation speed and actual rotation speed are first differentiated starting from the point of injection, whereby a constant distance between the rotation speed reference value and the actual rotation speed is eliminated, then integrated again over the error area.

8. The method of claim 5, wherein a learning rule for determining the variation of the characteristic curves and/or characteristic curve fields of the acceleration-dependent amplitude is further used in the work phase, so that the frictional precontrol is constantly adapted to changed operating conditions.

9. The method of claim 3, wherein:

the correction pulse is injected at the time when the rotation speed reference value passes through zero;

when the rotation speed reference value passes through zero from negative values to positive values, the correction pulse is added and when the rotation speed reference value passes through zero from positive values to negative values, the correction pulse is subtracted.

10. A device for numerical control of machines with at least one axis, the device comprising:

a frictional precontrol integrated in an axis control as an additional precontrol branch;

a first differentiator for differentiating position reference values, thereby obtaining a rotation speed reference value;

a second differentiator for differentiating the rotation speed reference value, thereby obtaining a reference acceleration;

an injection logic which receives the rotation speed reference value and controls an injection time of a rotation speed correction value when the rotation speed reference value nsoll passes through zero, the correction value having an amplitude;

a storage device containing an acceleration-dependent characteristic curve of the amplitude, which storage device is triggered by the reference acceleration obtained, wherein the characteristic curve of the amplitude increases starting from a zero acceleration, runs at a high level in the area of medium accelerations, and assumes smaller values when the acceleration further increases; and a correction pulse generator which receives the amplitude obtained using the characteristic curve and which generates the rotation speed correction value and adds it to a position control signal of the axis control.

11. A device for numerical control of machines with at least one axis, the device comprising:

a frictional precontrol integrated in an axis control as an additional precontrol branch;

a first differentiator for differentiating position reference values, thereby obtaining a rotation speed reference value;

a second differentiator for differentiating the rotation speed reference value, thereby obtaining a reference acceleration;

a neural network with an input for receiving the rotation speed reference values and acceleration reference values;

a logical switch which generates an error value from a difference of the rotation speed reference value and an actual rotation speed, the error value being supplied to the neural network;

an injection logic which is supplied with an amplitude value and a time constant by the neural network, the injection logic controlling an injection time of a rotation speed correction value; and a correction pulse generator which is controlled by the injection logic to generate the rotation speed correction value and to add it to a position control signal of the axis control.

* * * * *